United States Patent
Peiffer et al.

(10) Patent No.: US 9,879,654 B2
(45) Date of Patent: Jan. 30, 2018

(54) SYSTEM AND METHOD FOR CONTROLLING OFFSHORE FLOATING WIND TURBINE PLATFORMS

(71) Applicant: PRINCIPLE POWER, INC., Emeryville, CA (US)

(72) Inventors: Antoine Peiffer, Oakland, CA (US); Christian Cermelli, La Londe les Maures (FR); Dominique Roddier, Oakland, CA (US)

(73) Assignee: PRINCIPLE POWER, INC., Emeryville, CA (US)

( * ) Notice: Subject to any disclaimer, the term of this patent is extended or adjusted under 35 U.S.C. 154(b) by 718 days.

(21) Appl. No.: 14/283,051

(22) Filed: May 20, 2014

(65) Prior Publication Data

US 2014/0339828 A1    Nov. 20, 2014

Related U.S. Application Data

(60) Provisional application No. 61/825,412, filed on May 20, 2013.

(51) Int. Cl.
*F03D 7/04*     (2006.01)
*B63B 22/20*    (2006.01)
(Continued)

(52) U.S. Cl.
CPC ............ *F03D 7/048* (2013.01); *B63B 22/20* (2013.01); *B63B 39/03* (2013.01); *B63B 43/06* (2013.01);
(Continued)

(58) Field of Classification Search
None
See application file for complete search history.

(56) References Cited

U.S. PATENT DOCUMENTS 3,835,800 A    9/1974    Lloyd, III et al.
4,166,426 A    9/1979    Lloyd, III
(Continued)

FOREIGN PATENT DOCUMENTS

CA    996764         9/1976
DE    19620906 A1    3/1998
(Continued)

OTHER PUBLICATIONS

International Search Report and Written Opinion of the International Searching Authority for PCT/US14/38853 dated Dec. 12, 2014.
(Continued)

*Primary Examiner* — Sean Shechtman
(74) *Attorney, Agent, or Firm* — Dergosits & Noah LLP; Michael Dergosits; Todd Noah (57) ABSTRACT

A method for controlling an inclination of a floating wind turbine platform comprising a generator, a set of turbine blades connected to a shaft inside a turbine nacelle, the turbine nacelle being mounted onto a tower, and at least three stabilizing columns is presented. Each of the at least three stabilizing columns have an internal volume for containing ballast. Position data associated with an orientation of the floating wind turbine is received. A heel angle in reference to the floating wind turbine platform is determined based on the position data. A first signal for adjusting at least one of a blade pitch of the set of turbine blades, and a torque of the generator is sent based on the determined heel angle. A second signal for distributing the ballast among the at least three stabilizing columns is also sent. The second signal for distributing the ballast is based on the determined heel angle and the first signal.

22 Claims, 8 Drawing Sheets

(51) Int. Cl.
    *B63B 43/06* (2006.01)
    *F03D 13/25* (2016.01)
    *F03D 7/02* (2006.01)
    *B63B 39/03* (2006.01)
    *B63B 35/44* (2006.01)

(52) U.S. Cl.
    CPC .............. *F03D 7/02* (2013.01); *F03D 13/25* (2016.05); *B63B 2035/446* (2013.01); *F05B 2240/93* (2013.01); *Y02E 10/721* (2013.01); *Y02E 10/723* (2013.01); *Y02E 10/727* (2013.01)

(56) References Cited

U.S. PATENT DOCUMENTS

| | | |
|---|---|---|
| 4,167,147 A | 9/1979 | Bergman |
| 4,538,939 A | 9/1985 | Johnson |
| 4,648,848 A | 3/1987 | Busch |
| 4,781,023 A | 11/1988 | Gordon |
| 5,558,215 A | 9/1996 | Steigerwald et al. |
| 7,086,809 B2 | 8/2006 | Busso |
| 7,156,037 B2 | 1/2007 | Borgen |
| 7,242,107 B1 | 7/2007 | Dempster |
| 7,281,881 B1 | 10/2007 | Cermelli et al. |
| 7,531,910 B2 | 5/2009 | Flottemesch |
| 8,053,916 B2 | 11/2011 | Edwards et al. |
| 8,129,852 B2 | 3/2012 | Edwards et al. |
| 8,471,396 B2 | 6/2013 | Roddier |
| 8,729,723 B2 | 5/2014 | Boureau et al. |
| 2003/0159638 A1 | 8/2003 | Lay et al. |
| 2004/0141812 A1 | 7/2004 | Busso |
| 2006/0165493 A1 | 7/2006 | Nim |
| 2007/0240624 A1 | 10/2007 | Collee et al. |
| 2008/0014025 A1 | 1/2008 | They |
| 2008/0038067 A1 | 2/2008 | Sharapov |
| 2010/0003134 A1 | 1/2010 | Edwards |
| 2010/0140944 A1 | 6/2010 | Gardiner et al. |
| 2011/0037264 A1* | 2/2011 | Roddier ............... B63B 35/44 290/44 |
| 2011/0074155 A1 | 3/2011 | Scholte-Wassink |
| 2011/0140426 A1 | 6/2011 | Garcia Lopez et al. |
| 2011/0148115 A1 | 6/2011 | Roznitsky et al. |
| 2012/0073487 A1 | 3/2012 | Pantaleon et al. |
| 2012/0269628 A1 | 10/2012 | Liu |
| 2012/0294681 A1 | 11/2012 | Wong |
| 2013/0099496 A1 | 4/2013 | Soheim |
| 2013/0276691 A1 | 10/2013 | Thieffry |
| 2014/0193259 A1 | 7/2014 | Borgen |
| 2014/0246232 A1 | 9/2014 | Wyatt |
| 2015/0147174 A1* | 5/2015 | Couchman ............. F03D 7/047 416/1 |
| 2015/0275850 A1 | 10/2015 | Numajiri |

FOREIGN PATENT DOCUMENTS

| | | |
|---|---|---|
| DE | 19802574 A1 | 3/1999 |
| DE | 20001864 U1 | 4/2000 |
| DE | 19955586 A1 | 6/2001 |
| DE | 20020232 U1 | 1/2002 |
| DE | 202014004373 U1 | 6/2014 |
| EP | 1363019 | 11/2003 |
| EP | 2143629 | 1/2010 |
| EP | 2074018 B1 | 5/2010 |
| GB | 1065216 A | 4/1967 |
| JP | 1988039500 | 2/1988 |
| JP | 1991235789 | 10/1991 |
| JP | 1992197887 | 7/1992 |
| JP | 1994158571 | 6/1994 |
| JP | 10511753 A | 11/1998 |
| JP | 2000203487 | 7/2000 |
| JP | 2001180584 | 7/2001 |
| JP | 2003343447 | 12/2003 |
| JP | 2008013101 | 1/2004 |
| JP | 2004175137 | 6/2004 |
| JP | 2004176626 | 6/2004 |
| JP | 2004218436 | 8/2004 |
| JP | 2004251139 | 9/2004 |
| JP | 2004526609 | 9/2004 |
| JP | 2005069025 | 3/2005 |
| JP | 2005271673 | 10/2005 |
| JP | 2006274816 | 10/2006 |
| JP | 2007002721 | 1/2007 |
| JP | 2007263077 | 10/2007 |
| JP | 2008095512 | 4/2008 |
| JP | 2010064649 | 3/2010 |
| JP | 2010115978 | 5/2010 |
| JP | 2010234980 | 10/2010 |
| JP | 2009213487 | 12/2011 |
| JP | 2012045981 | 3/2012 |
| JP | 2012107584 | 6/2012 |
| JP | 2002188557 | 7/2012 |
| JP | 2014061848 | 4/2014 |
| JP | 2014111924 | 6/2014 |
| JP | 2014218186 | 11/2014 |
| JP | 2014218958 | 11/2014 |
| JP | 2015006884 | 1/2015 |
| WO | 8505174 | 11/1985 |
| WO | 200134977 | 5/2001 |
| WO | 0228702 | 4/2002 |
| WO | 02/073032 A1 | 9/2002 |
| WO | 02/087959 | 11/2002 |
| WO | 2002088475 A1 | 11/2002 |
| WO | 2007071647 | 6/2007 |
| WO | 2011138824 | 11/2011 |
| WO | 2011147482 | 12/2011 |
| WO | 2012059381 | 5/2012 |
| WO | 2013156759 | 10/2013 |
| WO | 2015063215 A1 | 5/2015 |
| WO | 2005075822 | 8/2015 |

OTHER PUBLICATIONS

European Search Report for Appln. No. 14152768.9 dated Mar. 27, 2014.
"A Study on Antiwave Performance of Box Girder Type Floating Wind Farm", by Ohta et al., 17th Marine Engineering Symposium, The Society of Naval Architects of Japan, Jul. 2003, pp. 115-118.
International Search Report and Written Opinion, International Application No. PCT/US15/57636, dated May 6, 2016, 12 pages.
International Preliminary Report on Patentability, International Application No. PCT/US09/39692, dated Jul. 15, 2010, 1 pages.
International Search Report and Written Opinion of the International Searching Authority for International Application No. PCT/US16/38235, dated Nov. 2, 2016, 11 pages.
Supplementary European Search Report for Application No. 14801382.4—1607/2992208, PCT/US2014038853, dated Nov. 25, 2016, 5 pages.

* cited by examiner

Prior Art

Figure 5

Prior Art

SYSTEM AND METHOD FOR CONTROLLING OFFSHORE FLOATING WIND TURBINE PLATFORMS

CROSS-REFERENCE TO RELATED APPLICATIONS

The present application claims the benefit of U.S. Provisional Patent Application 61/825,412, entitled, "Fully-Integrated Control System For Offshore Floating Wind Turbine Platforms", filed on May 20, 2013. The contents of U.S. Provisional Patent Application 61/825,412 and U.S. Pat. No. 8,471,396, entitled "Column-stabilized offshore platform with water-entrapment plates and asymmetric mooring system for support of offshore wind turbines," issued on Jun. 25, 2013, are hereby incorporated by reference.

BACKGROUND OF THE INVENTION

The present invention relates to offshore floating wind turbines. In particular, it presents a system and method for controlling floating wind turbine installations to minimize or reduce their heel angles.

BRIEF SUMMARY OF THE INVENTION

The disclosed subject matter relates to a machine-implemented method for controlling an inclination of a floating wind turbine platform that includes a generator, a set of turbine blades connected to a shaft inside a turbine nacelle, the turbine nacelle being mounted onto a tower, and at least three stabilizing columns to which the tower is mounted, where each of the at least three stabilizing columns have an internal volume for containing ballast. Position data measured in a defined frame of reference of the floating wind turbine is received at a processor. A heel angle in reference to the floating wind turbine platform is determined based on the position data. A first signal is sent from the processor for adjusting at least one of a blade pitch of the set of turbine blades and a torque of the generator based on the determined heel angle. A second signal is sent from the processor for distributing the ballast among the at least three stabilizing columns. The second signal for distributing the ballast is based on the determined heel angle and the first signal for adjusting the at least one of the blade pitch of the set of turbine blades and the torque of the generator.

The disclosed subject matter also relates to a non-transitory computer-readable medium comprising instructions stored therein. The instructions are for controlling an inclination of a floating wind turbine platform. The wind turbine platform includes a generator, a set of turbine blades connected to a shaft inside a turbine nacelle, the turbine nacelle being mounted onto a tower, and at least three stabilizing columns to which the tower is fastened. Each of the at least three stabilizing columns has an internal volume for containing ballast. The instructions, when executed by a system, cause the system to perform operations including receiving roll and pitch angle data in a defined frame of reference of the floating wind turbine. At least one of a blade pitch of the set of turbine blades and a torque of the generator is adjusted to alter an aerodynamic torque of the floating wind turbine platform, the adjusting being based on the received roll and pitch angle data. The ballast is distributed among the at least three stabilizing columns based on the adjusting of the at least one of the blade pitch of the set of turbine blades and the torque of the generator, and the received roll and pitch angle data.

According to various aspects of the subject technology, a system for controlling inclination of several floating wind turbine platforms, where each of the several wind turbine platforms includes a generator, a set of turbine blades connected to a shaft inside a turbine nacelle, the turbine nacelle being mounted onto a tower, and at least three stabilizing columns to which the tower is mounted, and each of the at least three stabilizing columns having an internal volume for containing ballast, is provided. The system includes one or more processors and a machine-readable medium. The machine-readable medium comprises instructions stored therein, which when executed by the system, cause the system to perform operations comprising receiving wind speed and direction data at one of the several floating wind turbine platforms. At least one of a blade pitch of the set of turbine blades and a torque of the generator is adjusted for each of the plurality of wind turbine platforms to alter an aerodynamic torque of the floating wind turbine platforms. The adjusting is based on the received wind speed and direction data. The ballast is distributed among the at least three stabilizing columns for each of the several turbine platforms. The distributing is based on the adjusting of the at least one of the blade pitch of the set of turbine blades and the torque of the generator, and the received wind speed and direction data.

In a specific embodiment, the floating wind turbine platform includes a floatation frame that includes the three stabilizing columns, and that supports the tower, the turbine nacelle, and the blades that rotate on top of the tower. Ballast water contained inside the stabilizing columns of the floatation frame can be pumped between stabilizing columns to keep the tower as vertically aligned as possible regardless of changes in wind speed or wind direction.

In order to create valuable synergies between the wind turbine and the floatation frame, this system and method are an improved version to the standard wind turbine controller in that it interacts directly with the controller of the ballast water pumps of the floatation frame, using additional measured signal inputs. This fully-integrated controller optimizes/improves the design life of the floatation frame and wind turbine tower by minimizing/reducing the platform heel angles while maximizing/maintaining good power production of the wind turbine.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

1. Identification and Significance of the Problem or Opportunity

Floating wind turbine technology is rapidly on its way towards commercialization. As of 2013, three full-scale prototypes with multi-megawatt turbines have been installed in the world, each using a different support platform type. The challenges associated with the design and operations of floating wind turbines are substantial. The floating platform, subject to wave and current loadings, bears a large weight (the wind turbine) and experiences large aerodynamic loads high above the water line. The large mass of the nacelle and rotor considerably raises the center of gravity of the platform compared to conventional floating structures, and the overturning moment created by the aerodynamic thrust at hub height is structurally penalizing.

The main challenge associated with floating wind turbines is the minimization or reduction of their motions to maintain optimal or good turbine performance, and minimize or reduce steel weight. A floating platform supporting a wind turbine will experience wind- and wave-induced motions.

In order to keep turbine performance at its best and to mitigate costs, the six degree-of-freedom motions have to be reduced or minimized as much as possible. The lateral motions of the platform—called surge and sway—are the most acceptable degrees of freedom. These planar motions mimic wind turbulence, and modify only the apparent wind speed on top of the tower.

The most unfavorable motions are the angular motions, rather the pitch and roll motions. These degrees-of-freedom result in high undesirable tower top motions and accelerations. If not restrained to acceptable limits, these motions and accelerations could considerably reduce the turbine performance, and reduce the structural life of the system. For example, considerable pitch or roll motions could modify the angle between the wind direction and the rotor plane, resulting in energy losses. The size and geometry of the floater matters the most for the platform dynamics. The stability of the floater is usually enhanced by its large size, the spacing between its water-piercing elements, and its large displacement. The designer is faced with a tradeoff between the stability and the size of the floater. It is desirable that the floater is both sufficiently stable and lightweight.

Another challenge lies in the adaptation of existing horizontal axis wind turbines (HAWTs). Typically, the turbine software, that is to say the system that carries the controller of the wind turbine, requires some modifications to accommodate peculiar floating wind turbine responses. Existing advanced control strategies are limited to use with onshore and fixed offshore wind turbines to achieve optimal or good power production while minimizing or reducing the loads on the turbine components.

The control objectives for floating wind turbines thus include the dampening of undesirable structural dynamic responses or the filtering of resonances due to natural wind turbulence or changes in wind speed and direction, and the maximization or improvement of power generation. Current control strategies for fixed wind turbines often involving the pitch angle of the turbine blades need to be re-engineered because the turbine is on a floating support. These active control system schemes must be adapted to floating wind turbines to limit wind-induced platform motions and mitigate coupling effects between floater and turbine.

A feature of the invention is aimed at creating a single controller for floating wind turbine platforms in order to meet the challenges described herein. This novel integrated controller minimizes or reduces the overall low-frequency angular response of the support platform.

Thus, the designer of the system can reduce the amount of construction material required for the floatation frame and the wind turbine components, and still target the same platform design life (mostly for fatigue-inducing cyclic loads), which would make its technology more economical and prone to reach unsubsidized market competitiveness.

2. Technical Approach for the Invention

In a specific implementation, a feature of the invention is based on the interaction of two existing controllers: the marine system controller of the support platform and the modified wind turbine controller. Each controller is described on its own first, and the integration of the two controllers, the subject of this invention, is then described in detail.

A. Marine System Controller

As presented in U.S. patent application Ser. No. 12/988,121, the marine system controller controls ballast water contained inside the three columns of the floatation frame that can be moved from columns to columns in order to maintain the low-frequency platform angular motions to zero or the wind tower vertical. This is a closed loop system, so the designer of the system fixes the necessary total amount of water based on the maximum overturning moment due to the maximum wind turbine thrust force.

Figure 1:
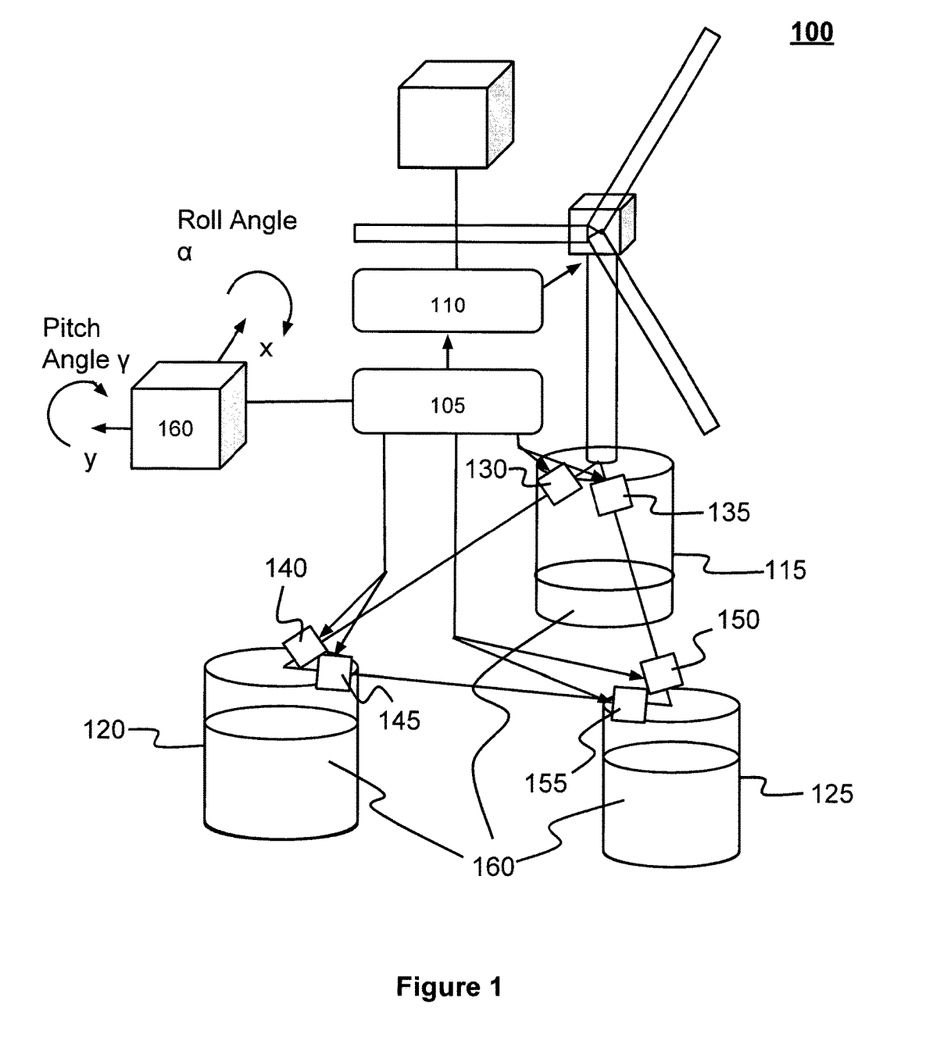
FIG. 1 shows a floating wind turbine platform with decoupled marine system and wind turbine controllers.

FIG. 1 shows a floating wind turbine platform 100 with decoupled marine system 105 and wind turbine controllers 110. For more redundancy and for a more efficient system, two pumps can be installed at each of the first column 115, second column 120, and third column 125, which would bring the total number of pumps for the system to six pumps (130, 135, 140, 145, 150, and 155). Each of the six pumps transfers ballast 160 from the column at which the pump resides to the column to which the pump is connected.

For example, the first column 115 has two pumps: pump 130 and pump 135. The pumps work on an on-and-off basis. They are switched on only occasionally, when the wind speed or direction changes significantly. The controller is optimally set to turn on the pumps on average a few times per day, despite considerable dynamics due to wind and wave disturbance, in order to avoid pump fatigue and excessive energy expenditures on the platform.

The platform is fitted with motion sensors 160 to measure the platform angular motions that can be used as input signals for the marine system controller. Accelerometers or inclinometers are composed of a simple moving mass mounted on springs that track gravity. They both sense the acceleration due to the rotation of the platform, but also due to the linear accelerations—in surge, sway, and heave.

As far as this marine system controller is concerned, both a bi-axial pitch- and roll-inclinometer or a bi-axial surge- and sway-accelerometer are acceptable since linear accelerations (surge and sway) can be transformed to angular motions (pitch and roll). Both sensors are acceptable so long they track the gravity component of the platform, which is similar to the low-frequency angular motions. These motions sensors can be installed at any location on the platform. Usually for redundancy again, several motion sensors are installed in different columns and their measurement outputs are compared at all times before being fed into the control loop.

Figure 2A:
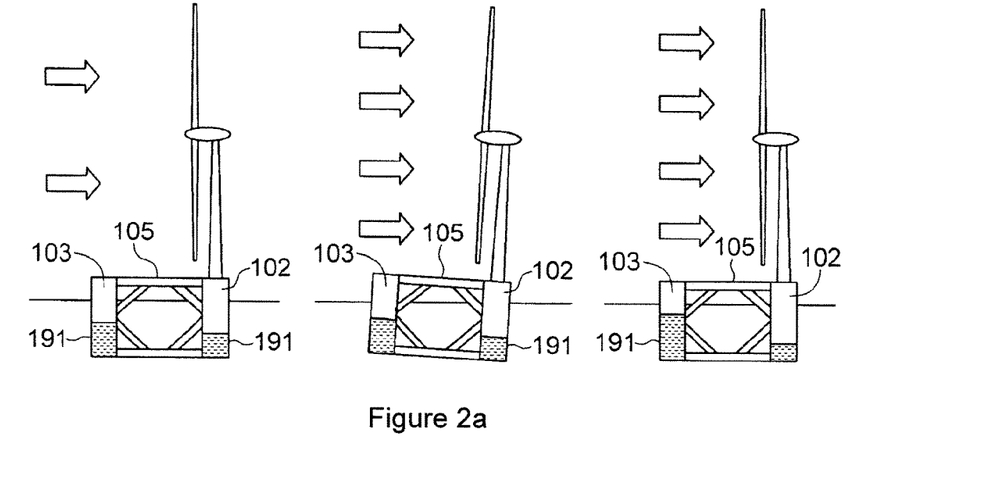
FIGS. 2a and 2b show example situations where the marine system controller turns on the appropriate pump to keep the tower vertical.
Figure 2B:
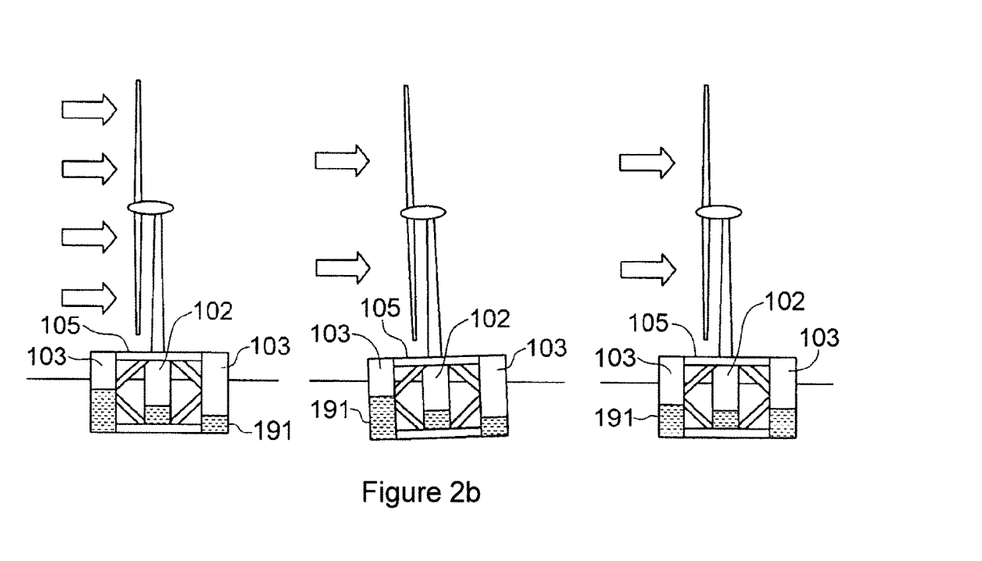

FIGS. 2a and 2b show example situations where the marine system controller turns on the appropriate pump to keep the tower vertical. (See, e.g., U.S. patent application Ser. No. 12/988,121 entitled "Column-stabilized offshore platform with water-entrapment plates and asymmetric mooring system for support of offshore wind turbines").

FIG. 2a shows a sudden change in wind speed will create a thrust force that will tend to cause the floating wind turbine platform 105 to lean away from the wind direction. If the wind is coming from between column 102 onto column 103, in the direction as shown in FIG. 2a, the torque caused by the wind will tend to push the downwind column 102 into the water and lift the upwind column 103 out of the water. As the wind speed and direction change, the wind turbine may utilize an internal active ballast system to transfer ballast 191 from one column to another in order to counteract the wind induced forces and moments and keep the structure 105 at the design floatation water line.

FIG. 2b shows an example of a change of wind direction. The active ballasting system will adjust the water in the columns 102, 103 when the wind has shifted. With reference to FIG. 2b, the floating wind turbine platform 105 is illustrated with the wind blowing at a 90-degree shift from the platform centerline wind direction, with the wind coming over the left side of the platform 105. The active ballast system has moved water from the right side column tank 191 to the left column tank 191 and the platform 105 is substantially horizontal. When the wind velocity drops and platform 105 has changed in its heel angle, the alignment sensor detects the list angle of the platform 105 and the controller instructs the pumps to move water 191 from the left column tank to the right column tank. The active ballast system moves water from the left column tank to increase the buoyancy and adds more water to the right column tank to increase the weight of the column. Platform 105 is again horizontal and the pumps have stopped until the inclination sensor detects another change in the platform inclination.

Figure 4:
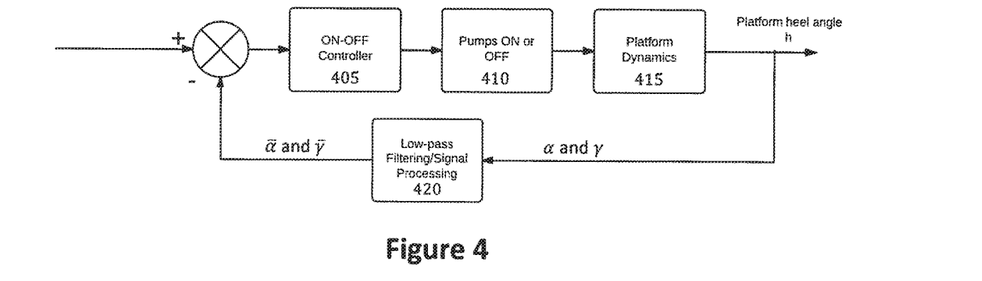
FIG. 4 shows a flowchart for a marine system controller.

FIG. 4 shows a flowchart for a marine system controller, including the logic behind the feedback controller. The platform roll and pitch angles, α and γ, are input signals to the controller at 405, provided by the platform sensors. Firstly, the measured signals are low-pass filtered at 420 to cancel off all the high-frequency disturbances resulting from the wave and wind dynamic and stochastic effects. The platform roll and pitch angles are low-pass filtered using standard low-pass filtering strategies such as high-order Butterworth filters. Based on the filtered platform pitch and roll angles, $\bar{\alpha}$ and $\bar{\gamma}$, the relative angles $\theta_{i\text{-}j}$ between column top centers i and j, are derived using the following equations:

$$\begin{cases} \theta_{1\text{-}2=} -\left(\frac{\sqrt{3}}{2}\bar{\gamma} + \frac{1}{2}\bar{\alpha}\right) \\ \theta_{1\text{-}3=} -\left(\frac{\sqrt{3}}{2}\bar{\gamma} + \frac{1}{2}\bar{\alpha}\right) \\ \theta_{2\text{-}3=\bar{\alpha}} \end{cases} \quad (1)$$

The following convention is used. If $\theta_{i\text{-}j}$ is positive, it means that column i is higher than column j. The error $e_{i\text{-}j}=|\theta_{set}-\theta_{i\text{-}j}|$ is the error used as an input of the controller. Usually, $\theta_{set}=0°$. Based on the sign of $\theta_{i\text{-}j}$, the correct pump $P_{i\text{-}j}$ will be turned on at 410 provided that $e_{i\text{-}j}$ is greater than a certain value that defines the dead-band for ON. The pumps $P_{i\text{-}j}$ or will be switched off provided that $e_{i\text{-}j}$ is less than a certain value that defines the dead-band for OFF. Depending on the relative angles $\theta_{i\text{-}j}$, one, two, or three pumps will be on. With this algorithm based on the relative angles between column top centers, the fastest water transfer path is always considered, thus the platform is always back to even keel very quickly or as fast as possible in every situation. Automatic bypass is also functioning with that approach, if one pump is suddenly deficient. The platform dynamics are measured, including its roll and pitch angles, α and γ, at 415 and used to provide a heel angle measurement fed back into the feedback loop.

A standard Proportional-Integral-Derivative (PID) controller could also be used in the determination of based on the heel angle error, but a simple on-off controller preceded by a filtered signal can be sufficient, due to the high capacitance of the system.

B. Conventional Wind Turbine Controller

The wind turbine controller includes a number of instruments, a number of actuators, and a computer system (or a microprocessor)—able to process the signals input by the instruments and communicate these signals to the actuators. The main objective of the wind turbine controller is the maximization or generation of the power production and the minimization or reduction of the extreme and cyclic loads on the wind turbine components.

Two types of control are usually performed by the system. The supervisory control allows the turbine to go from one operational state to the other. Examples of operational states are start-up, power production, normal shutdown, emergency shutdown, standby, and so forth.

The second type of control performed by a wind turbine is called closed-loop control and occurs at a given operational state of the turbine to keep the turbine at some defined characteristic or operational boundary for that state.

The wind turbine thrust force $F_T$, the aerodynamic torque $T_r$, and the power $P_r$ vary according to:

$$\begin{cases} F_T = \frac{1}{2}\rho A C_T(\lambda, \beta) V^2 \\ T_r = \frac{1}{2}\rho A R C_q(\lambda, \beta) V^2 \\ P_r = \frac{1}{2}\rho A C_p(\lambda, \beta) V^3 \end{cases} \quad (2)$$

Where ρ is the density of air, R is the rotor radius, $A=\pi R^2$ is the rotor swept area, V is the wind speed, $C_T$ is the thrust coefficient, $C_q$ is the torque coefficient, and $C_p$ is the power coefficient. All the non-dimensional coefficients ($C_T$, $C_q$, and Cp) depend on two parameters, the speed-tip ratio λ, and the blade pitch angle β. The speed-tip ratio is the ratio of the angular speed of the rotor ω at the tip of the blade over the wind speed V.

Figure 11:
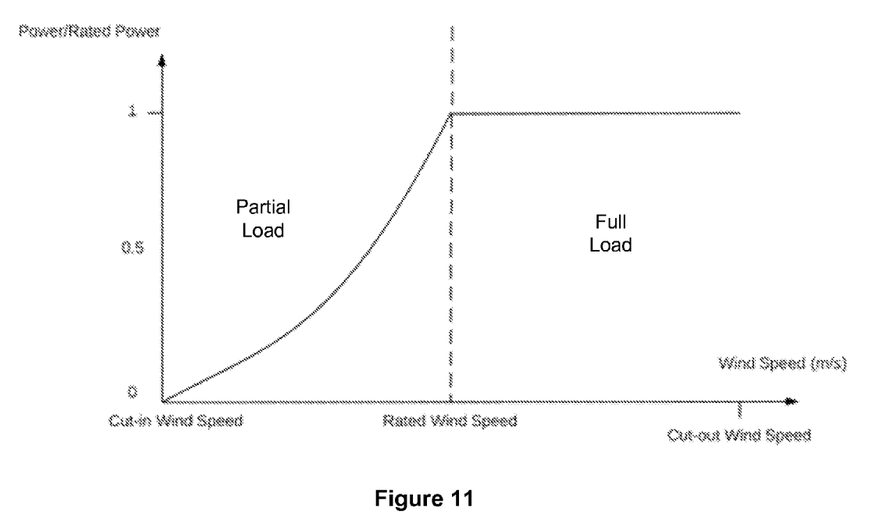
FIG. 11 shows a plot of wind speed versus power.
Figure 12:
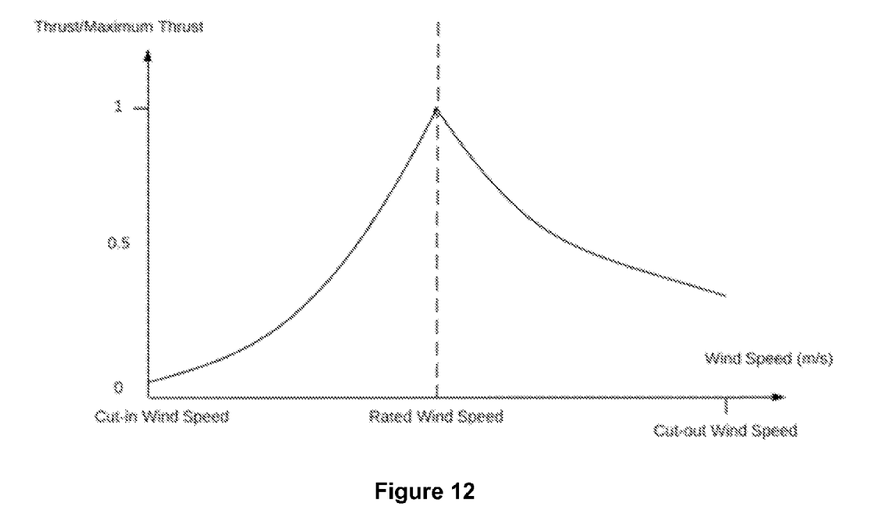
FIG. 12 shows a plot of wind speed versus thrust.

Typically, in power production mode, depending on the wind speed, two control regions called partial load and full load require different control strategies. These control regions are presented in FIGS. 11 and 12. FIG. 11 is a plot of wind speed versus power in the partial load and full load regions. FIG. 12 is a plot of wind speed versus thrust in the partial load and full load regions.

In partial load, when the wind speed is below the rated wind speed—the lowest wind speed at which the turbine produces the maximum power—the controller will vary the generator torque to maximize the aerodynamic power capture, while keeping the blade pitch angle β at its optimal setting (usually zero degree).

Basically, the generator torque can be controlled to any desired value, which is proportional to the square of the filtered generator speed, with the aim of varying the rotor rotational speed to maintain a constant and optimal tip-speed ratio λ.

Figure 5:
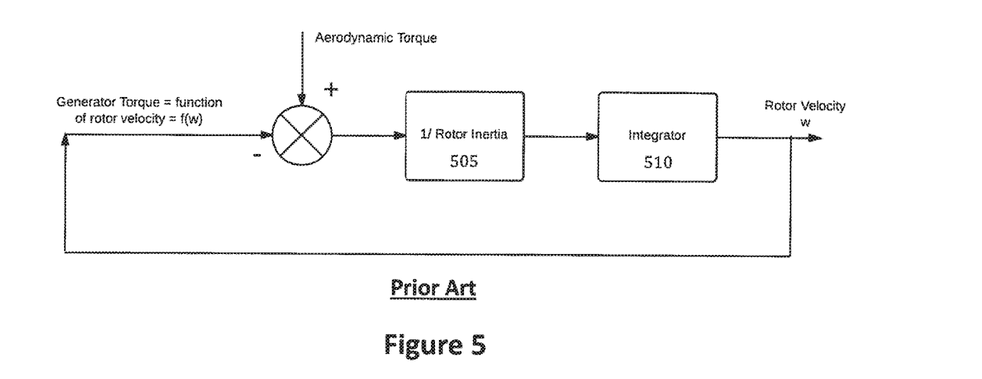
FIG. 5 shows a flowchart for standard variable torque controller for a wind turbine.

FIG. 5 shows a flowchart for standard variable torque controller for a wind turbine. The aerodynamic torque $T_R$ is an input to the controller, and will always try to be matched by the generator torque $T_G$ command, based on the actual rotor velocity ω. The rotor inertia J 505, and an integrator block 510 come into play to represent the dynamic of the system described by the following equation:

$$T_R - T_G = J\dot{\omega}$$

In full load, or above rated wind speed, the power produced is close to the rated power, but the turbine must limit or reduce the aerodynamic power extraction (or the Cp coefficient) so as not to exceed turbine component design loads, such as the generator. This time, the rotor spins at a constant angular speed ω, so the only parameter that can reduce the power coefficient Cp is the blade pitch angle β.

The generator torque is also held constant at the rated torque, but could also be controlled. The additional aerodynamic power that could be extracted is thus shed by varying the blade pitch angle. An increase in blade pitch angle—when the leading edge of the blade is turned into the wind—diminishes the aerodynamic torque by decreasing the angle of attack, hence the lift on the blades. Here, conventional PI or PID control strategies are used to modify the blade pitch angle, based on the generator speed error between the filtered generator speed and the rated generator speed. In some cases, notch filters are used to prevent excessive controller actions at the natural frequency of certain turbine components, such as the drivetrain torsional frequency or the blade passing frequency.

Figure 6:
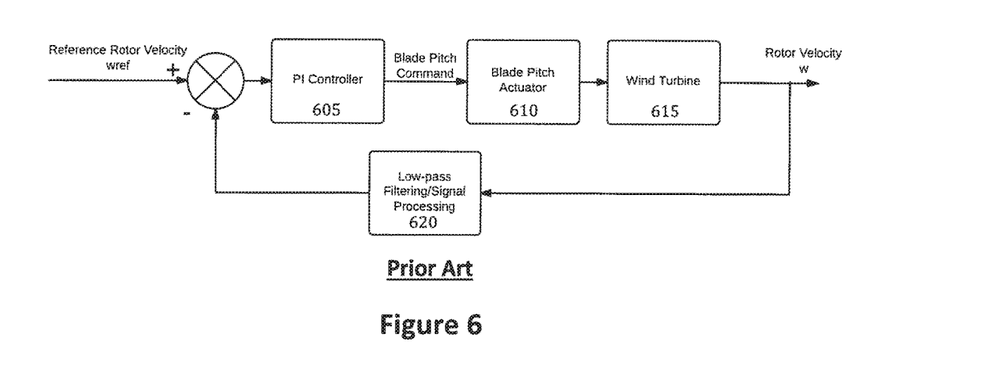
FIG. 6 shows a control diagram for a standard collective blade pitch controller for a wind turbine.

FIG. 6 shows a control diagram for a standard collective blade pitch controller for a wind turbine. The rotor velocity ω is measured, properly filtered and processed by 620, and compared to its setpoint $\omega_{ref}$ (the rotor velocity at rated power), which creates an error signal. This rotor speed error signal is fed into a PI controller 605 to compute the pitch command sent to the blade pitch actuator 610. The wind turbine 615 continues to operate as the blade pitch angles are being controlled.

During a turbine startup, the PI controller 605 sends a command to the blade pitch actuator 610 to pitch the blades from feather (90 degrees) to the run position and let the wind accelerate the rotor until a certain speed is reached. The generator is then engaged and the wind turbine 615 starts producing power.

Similarly, for a normal turbine shutdown, the blades are pitched from their run position to feather. The generator is disengaged, when the turbine slows enough to drop the power to zero.

C. Integrated Controller

During power production, sudden variations of wind speed or directions can occur quite often at the site of floating wind turbines. These variations directly impact the overall magnitude and direction of the thrust force of the turbine applied to the rotor disk area in the direction of the wind. Viewed from the supporting platform far below the wind turbine hub, the thrust force represents an overturning moment to be withstood, and can yield high platform heel angles. Even if temporary, these high heel angles are detrimental to the overall system design life, and should be minimized during the unit lifetime.

In a specific embodiment, a feature of the invention includes an integrated controller that controls the wind turbine and the ballast pump simultaneously, in order to maintain the platform heel angle below a certain limit at all times or as desired. This controller is an extension of conventional wind turbine controllers in that it is modified to interact directly with the ballast pumps to minimize the heel angles of the floatation frame. The main benefit brought by this invention is a rise in the structural design life of the floatation frame if the same amount of construction material (most of the case, it is steel) is used, without sacrificing the overall power output of the turbine.

Based on industry experience, heel angles of up to 15 degrees could be reached by a floating wind turbine platform when the maximum thrust of the wind turbine is applied at the hub height. If the two controllers are decoupled, as described in the first two paragraph of this section, the platform marine system controller works independently of the wind turbine. A simple signal can be shared between the two controllers to shut down the turbine if a fault occurs on the platform.

If the two control systems are completely decoupled, the platform will experience high heel angles in sudden shifts of wind speed or direction. The reason lies behind the difference in time constants for the two control systems. The turbine controller usually acts very quickly on the scale of a second, since it is designed to adapt to the quick disturbances of wind speed due to turbulence. The marine system controller is working on a timeframe of about ten minutes, because of the time necessary to pump water from one column to another.

For example, if the wind shifts from the cut-in wind speed to the rated wind speed in a matter of minutes, an extreme heel angle of about 15 degrees could be experienced by the floating platform, until the marine system controller triggers the appropriate ballast pumps to bring the platform back to even keel. At this high heel angle, the power output of the turbine would be reduced by the cosine of the heel angle of 15 degrees, since the rotor swept area is reduced.

Thus, a platform high heel angle results in some loss in turbine power output. So, the marine system controller, even if used independently of the turbine controller, presents the benefit of keeping the tower vertical most of the time, but high heel angles are still experienced during transients (such as turbine startups or shutdowns) or sudden shifts of wind speed or wind direction.

Figure 3:
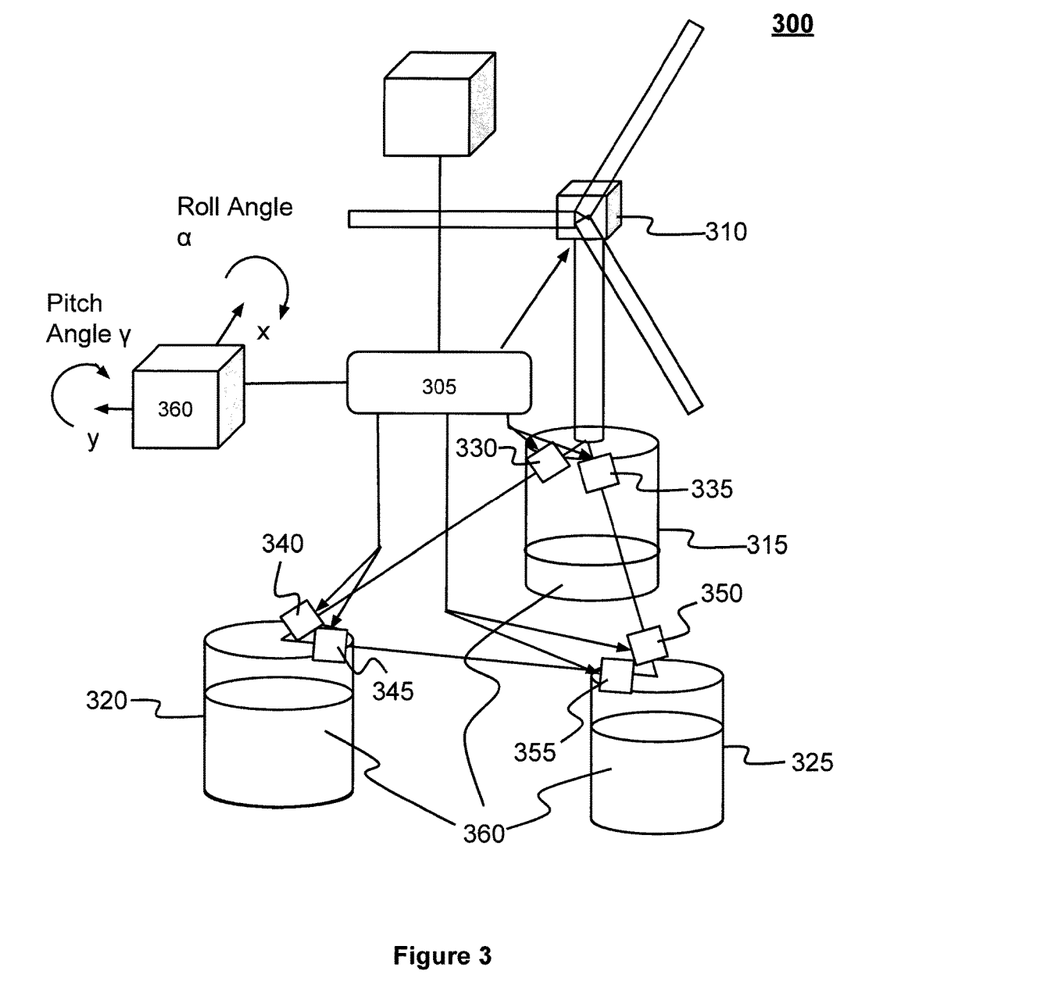
FIG. 3 shows a floating wind turbine platform with an integrated floating wind turbine controller.

FIG. 3 shows a floating wind turbine platform 300 with an integrated floating wind turbine controller 305. In a specific embodiment of this invention, the wind turbine controller 305 directly controls the platform pumps (330, 335, 340, 345, 350, and 355), in order to remedy the issues presented by two decoupled controllers. The platform pitch and roll angle information obtained by motion sensors 360 can be used directly by the turbine controller to keep the platform heel angle below a certain limit, say 5 degrees, at all times or as desired.

The wind turbine controller 305 would control either the generator torque or the blade pitch angle (or both at the same time) to temporarily maintain the thrust of the turbine 310 at a lower level, while water is being pumped from between the three columns (315, 320, and 325). In other words, the change of thrust loading on the turbine 310 resulting in an overturning moment will match or correspond to the change of righting moment due to the ballast water.

During that transition period—when the water 360 is being pumped from column to column—the overall thrust and power output of the turbine could be lower, but the platform heel angle would also be lower (below 5 degrees), which would actually keep the power production higher, than if the platform heel angle was 15 degrees.

There is clearly a tradeoff between the platform maximum allowable heel angle and the power production. If the heel angle is kept too low, the change in thrust will be very small while water is being pumped, leading to a lower power output than if the ballast pumps were started after the change in thrust. If the heel angle is kept too high, the power output loss originates from the cosine term. In other words, an optimal point can be found at which the power production would be maximized at all times or sufficiently high, while the low-frequency platform heel angle would be kept low, leading to an increase in the design life of the platform (mostly cyclic loads due to the weight of the rotor nacelle assembly in high heel angles).

However, in many cases, the main benefit of this system is truly the reduced amount of construction material for the platform, such as steel, which will improve the cost-effectiveness of floating wind turbine technologies.

In a specific implementation, this novel integrated controller entails the modification of a conventional wind turbine controller to control the aerodynamic torque (or thrust force) of the wind turbine while allowing the activation of appropriate ballast water pumps.

Equation (2) suggests that the thrust and the aerodynamic torque can be reduced if either the tip-speed ratio λ, or the blade pitch β are modified (or both at the same time). Therefore, these two parameters can be changed by the controller in partial load and in full load to maintain an aerodynamic torque that would minimize or reduce the platform heel angle.

At this stage, several options are considered depending on the operational state and the region of control for the wind turbine. The platform heel angle h would be a combination of roll and pitch and is defined as the squares root of the sum of the roll and pitch angles squared:

$$h=\sqrt{\alpha^2+\gamma^2} \quad (3)$$

i. Approach in Power Production

In a specific implementation, in a first form, the generator torque demand could be adjusted to modify the tip-speed ratio λ or the rotor speed, in order to reduce the aerodynamic thrust when the platform heel exceeds a certain set point. The appropriate pumps could then be started up by the control system, and the torque demand would be constantly adjusted, until the pumps are turned off, and normal operation can restart.

During that transition period, the generator torque would be partially controlled based on the platform heel angles measured from the inclinometers or accelerometers. The conventional wind component of the generator torque is obtained through a direct measurement and low-pass filtering of the rotor velocity. With this strategy in mind, the torque of the turbine would be derived as a sum of two terms, one due to the platform heel, and one due to wind-induced conventional rotor velocity.

If the platform reaches a heel angle greater than a given set point (for example 5 degrees), this new control loop is called by the system. Automatically, the right pumps are switched on, while the desired torque would be calculated slightly differently to temporarily reduce the rotor aerodynamic torque (or thrust). This control loop comprises two branches.

Figure 7:
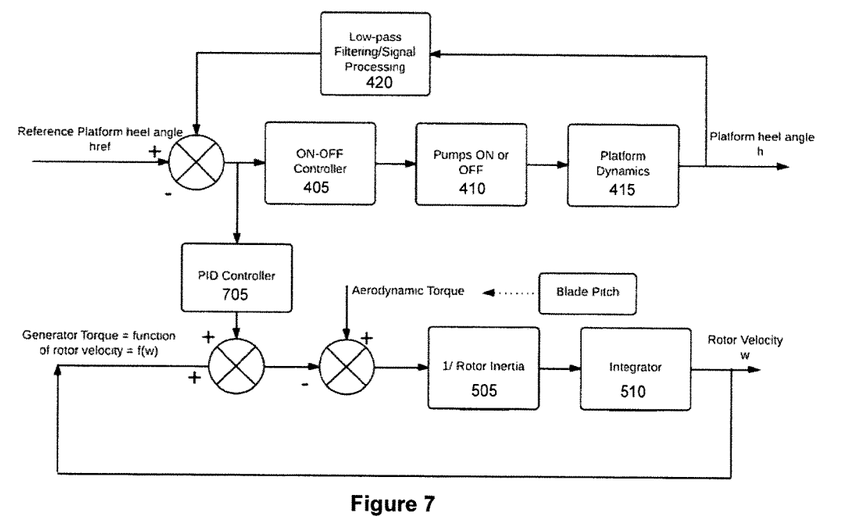
FIG. 7 shows a flowchart for an integrated controller with a modification of the standard torque control loop.

FIG. 7 shows a flowchart for an integrated controller with a modification of the standard torque control loop. The first branch is the branch already used on conventional variable speed controllers, as shown in FIG. 5. The generator speed is first used as an input, low-pass filtered, and the generator torque is determined based on a formula or lookup table. Usually, the generator torque is directly proportional to the filtered rotor velocity squared.

The second branch of the control loop (as described with reference to FIG. 4) uses the platform roll and pitch angles as input signals, calculates the heel angle of the platform in the frame of reference of the nacelle turned into the wind, low-pass filters this heel angle, and finally computes the second component of the desired torque using a PID controller 705 based on the platform heel angle error.

Figure 8:
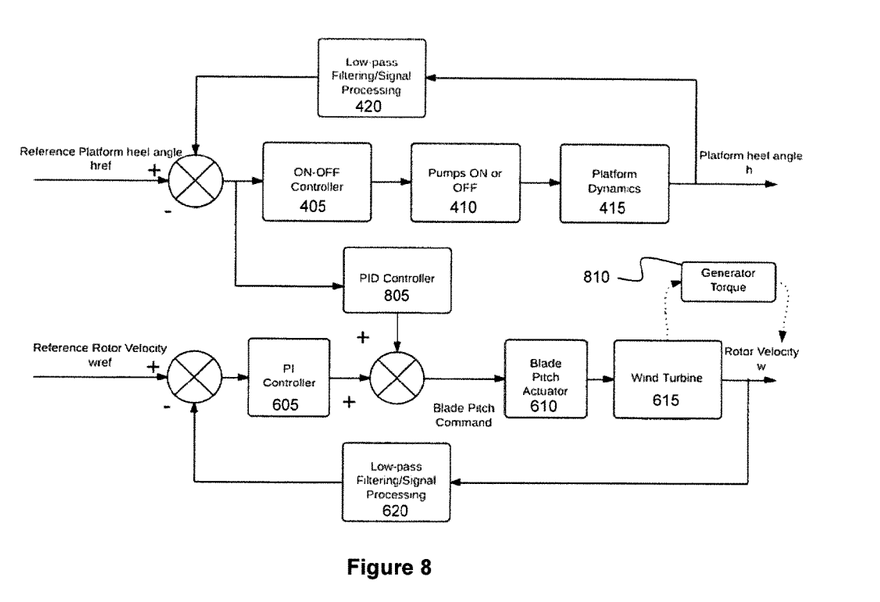
FIG. 8 shows a flowchart for an integrated controller with a modification of the standard blade pitch control loop.

FIG. 8 shows a flowchart for an integrated controller with a modification of the standard blade pitch control loop. In a second form, the torque is still determined in a conventional way, as shown in FIG. 6, so that the most optimal rotor speed is met, but the blade pitch angle is modified to control the aerodynamic torque. The blade pitch command is computed based on the sum of the typical filtered rotor speed error component calculated with a PID controller 805, and a second component based on the platform heel angle error calculated again with a PID controller 805. The new pitch command is the sum of these two components, only if the platform error exceeds a certain heel angle (for example 5 degrees). In that case again, the controller presents a control loop with two branches, one branch dealing with the component based on the filtered rotor speed error, the other branch taking care of the other component based on the filtered platform heel angle error.

In a specific implementation, a combination of these two forms of control is provided for both regions of turbine operation, in partial load and in full load. The modification of both the generator torque 810 and the blade pitch angle in both regions would add flexibility in the control system, regardless of the control region. For certain types of turbine, it is already not atypical to see the blade pitch angle being controlled below rated wind speed, and the generator torque being controlled above rated wind speed.

Thus, on the same principle, the generator torque controller in the first form and the blade pitch controller in the second form could be combined to temporarily control the aerodynamic torque, while the water is being shifted from column to column. The combination of both strategies would improve the overall performance of this integrated controller.

ii. Approach for Gentle Turbine Startups and Shutdowns

Gentle startup and shutdowns procedures are definitively desirable, as they can be intense fatigue life drainers for the turbine and the floatation frame. In a specific embodiment, a feature of the invention also relates to a controller that is used in the case of startup and shutdowns on the same principles as the ones described in operation.

In the case of a startup, the blade pitch is controlled to go from feather-to-pitch at the same speed as the ballast water is moved from column to column, so that the heel angle of the platform remains low at all times during the procedure. In the case of a shutdown, the blades would be controlled to go from pitch-to-feather while allowing the ballast water to maintain the platform even keel, until the turbine is stopped.

In both cases, the filtered platform heel angle error could be used as an input to an extra branch in the control loop to calculate the blade pitch at all times. As a result, the blade pitch increase or decrease is much slower than in the case of a conventional controller. Similarly, the generator torque ramp-up or ramp-down time could be increased to match the required ballasting time, in order to minimize or reduce the platform heel angle at all times or as desired during startup and shutdowns. Again, a combination of blade pitch and torque control can be used simultaneously to produce the same intended results.

D. Other Versions of the Integrated Controller i. For a Single Floating Wind Turbine: Pre-Compensation In another form, the wind turbine system controller could anticipate a change in wind speed or direction that would trigger an imminent startup or shutdown of the turbine, and pre-transfer water from column to column before any turbine action is performed. For instance, in the case of a turbine shutdown, the platform would be pre-inclined while the turbine is still spinning, so that half of the water ballast transfer is done upfront. The turbine would then be shut down, and the ballast water would continue to be transferred between columns until the platform is even keel. This ballast water pre-compensation scheme would halve the maximum platform heel angle.

In that case, the controller could use two extra input signals: an estimate of the mean wind speed and wind direction. A pre-compensation algorithm would be applied to pre-adjust the amount of ballast water in the different columns. Instruments such as anemometers or Light Detection and Ranging or Laser Imaging Detection and Ranging (LIDAR) sensors can be installed for that purpose.

This strategy leads to two possibilities: it could be a complementary approach to refine the first integrated controller described in the previous section (more information comes from the wind measurements), or it could be a much simpler integrated controller decoupled with existing wind turbine control schemes (variable torque and pitch controllers), and therefore could be implemented in a much easier fashion.

This control strategy could be employed in power production as well, when the wind turbine detects any significant change in wind speed and direction. Ballast water could be pre-adjusted in the platform columns, so that the maximum heel angle experienced by the platform in any situation would be reduced by a factor of two. At all times or as desired, the amount of water in the different columns can be determined based on the thrust force of the turbine and its applied direction, so based on the wind speed and the wind direction. Based on this information, a look-up table could be derived, and the wind turbine controller would follow that table to pre-adjust the ballast water of the platform as desired such as every time the measured heel angle exceeds a given reference heel angle (say again 5 degrees).

ii. For a Floating Wind Turbine Farm

Figure 9:
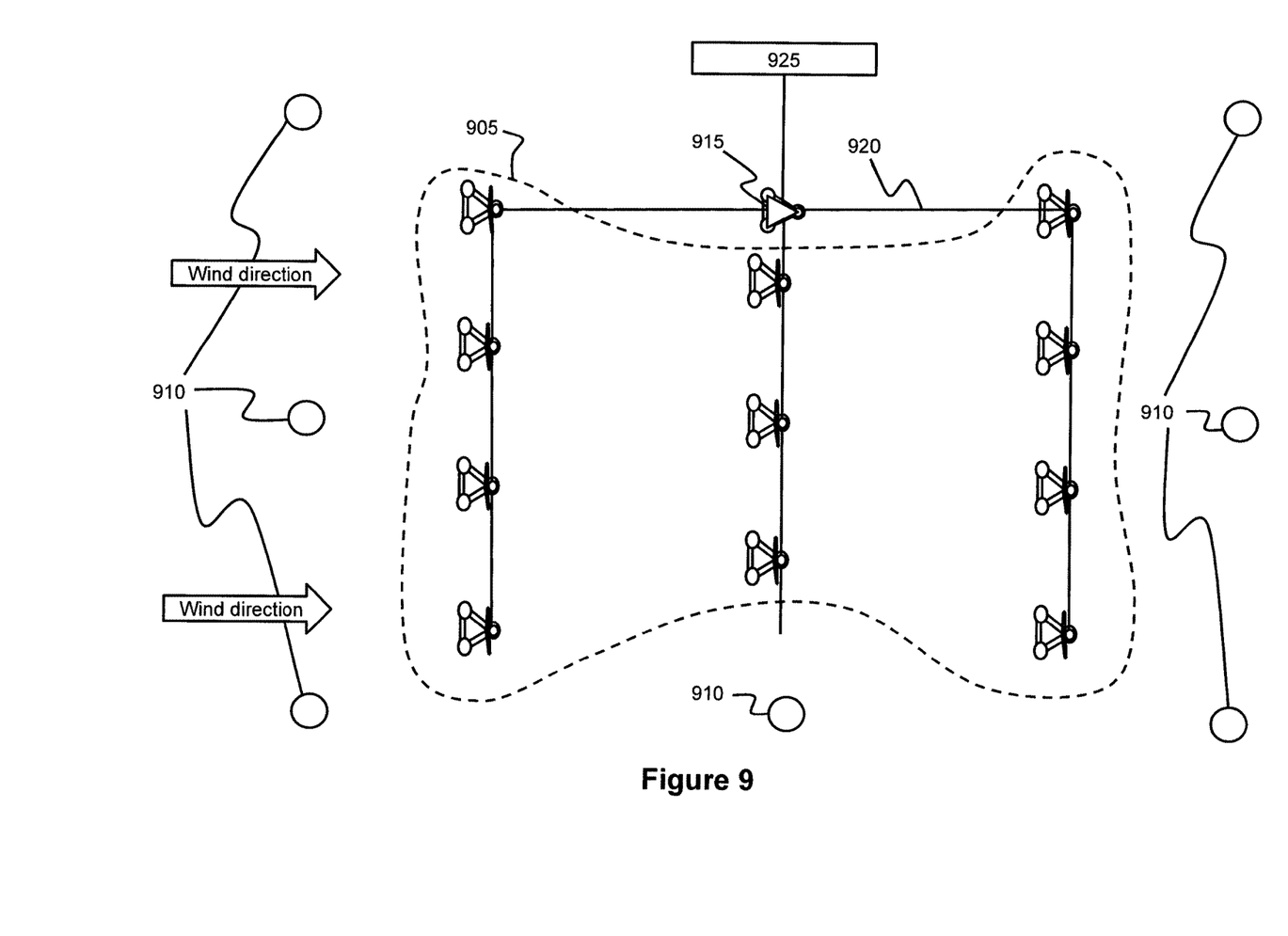
FIG. 9 shows an example of a farm layout with wind sensors that allow ballast water pre-compensation.

FIG. 9 shows an example of a farm layout with wind sensors that allow ballast water pre-compensation. In the case of a farm of floating wind turbines 905, previously described integrated control strategies can be implemented, and external input signals can also be used to refine the overall control scheme. Indeed, wind speed and direction measurement sensors can be installed a few miles away in different directions around the farm to predict any sudden change in wind speed or direction. The floating wind turbine farm is fitted with a few wind measurement sensors 910 such as LIDARS at different headings, to gauge the change in wind speed and direction at the site. The wind turbine controller of all the floating wind turbines in the farm can directly use these measurements as input signals to pre-adjust the amount of ballast water in the columns of each floatation frame, before the wind arrives at the farm at this wind speed or direction.

On top of that, the wind turbine controllers in a farm setting can communicate with one another over a standard data network to minimize the heel angle of the platforms. At a given time, the most upwind floating wind turbine in the farm, which is the first one to experience a change of heel angle after the wind speed or direction have shifted, can share the new appropriate ballast water configuration with the other more downwind floating wind turbines. The other floating wind turbines in the farm could then anticipate any changes in wind speed and direction through the sharing of information on the data network. A "leading" floating wind turbine would dictate the appropriate ballast water configuration for the whole farm. This "leading" floating wind turbine would be determined automatically by the controller, based on its position in the farm, and the wind speed and direction measured given by the neighboring sensors. The farm of floating wind turbines is connected to an offshore substation 915, which is ultimately connected to a shore substation 915 via electrical cables 920.

Figure 10:
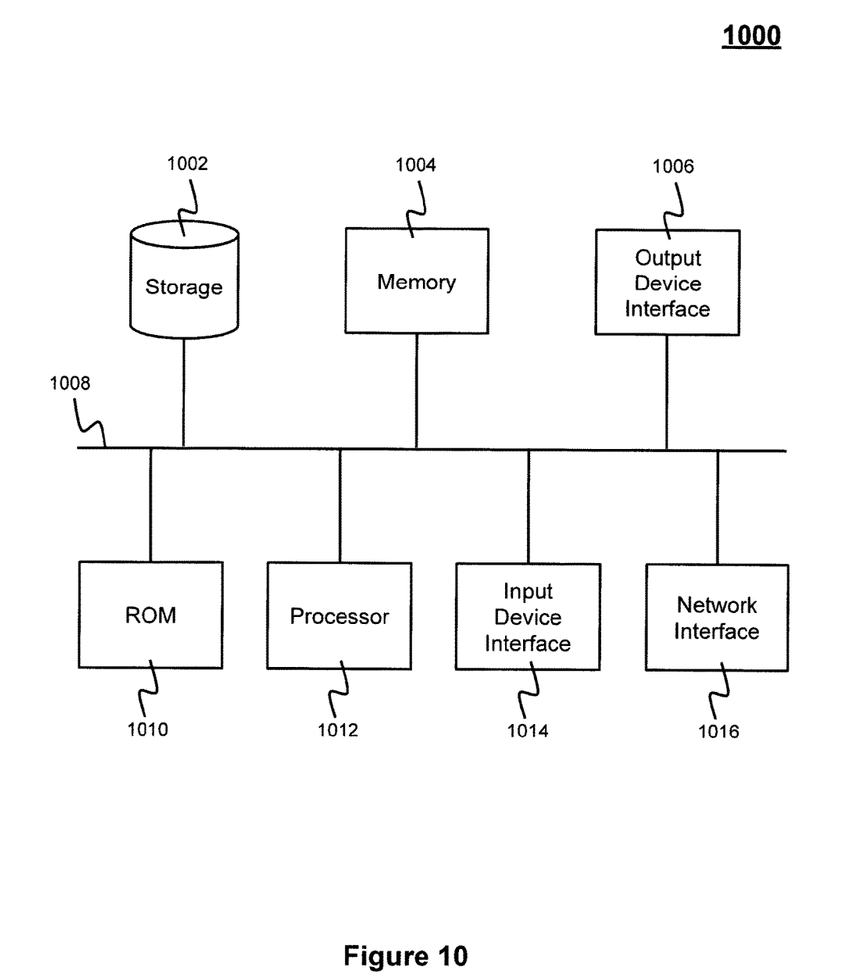
FIG. 10 conceptually illustrates an example electronic system with which some implementations of the subject technology are implemented.

FIG. 10 conceptually illustrates an example electronic system 1000 with which some implementations of the subject technology are implemented. Electronic system 1000 can be a computer, phone, PDA, or any other sort of electronic device. Such an electronic system includes various types of computer readable media and interfaces for various other types of computer readable media. Electronic system 1000 includes a bus 1008, processing unit(s) 1012, a system memory 1004, a read-only memory (ROM) 1010, a permanent storage device 1002, an input device interface 1014, an output device interface 1006, and a network interface 1016.

Bus 1008 collectively represents all system, peripheral, and chipset buses that communicatively connect the numerous internal devices of electronic system 1000. For instance, bus 1008 communicatively connects processing unit(s) 1012 with ROM 1010, system memory 1004, and permanent storage device 1002.

From these various memory units, processing unit(s) 1012 retrieves instructions to execute and data to process in order to execute the processes of the subject disclosure. The processing unit(s) can be a single processor or a multi-core processor in different implementations.

ROM 1010 stores static data and instructions that are needed by processing unit(s) 1012 and other modules of the electronic system. Permanent storage device 1002, on the other hand, is a read-and-write memory device. This device is a non-volatile memory unit that stores instructions and data even when electronic system 1000 is off. Some implementations of the subject disclosure use a mass-storage device (such as a magnetic or optical disk and its corresponding disk drive) as permanent storage device 1002.

Other implementations use a removable storage device (such as a floppy disk, flash drive, and its corresponding disk drive) as permanent storage device 1002. Like permanent storage device 1002, system memory 1004 is a read-and-write memory device. However, unlike storage device 1002, system memory 1004 is a volatile read-and-write memory, such as random access memory. System memory 1004 stores some of the instructions and data that the processor needs at runtime. In some implementations, the processes of the subject disclosure are stored in system memory 1004, permanent storage device 1002, and/or ROM 1010. For example, the various memory units include instructions for controlling an inclination of a floating wind turbine platform in accordance with some implementations. From these various memory units, processing unit(s) 1012 retrieves instructions to execute and data to process in order to execute the processes of some implementations.

Bus 1008 also connects to input and output device interfaces 1014 and 1006. Input device interface 1014 enables the user to communicate information and select commands to the electronic system. Input devices used with input device interface 1014 include, for example, alphanumeric keyboards and pointing devices (also called "cursor control devices"). Output device interface 1006 enables, for example, the display of images generated by the electronic system 1000. Output devices used with output device interface 1006 include, for example, printers and display devices, such as cathode ray tubes (CRT) or liquid crystal displays (LCD). Some implementations include devices such as a touchscreen that functions as both input and output devices.

Finally, as shown in FIG. 10, bus 1008 also couples electronic system 1000 to a network (not shown) through a network interface 1016. In this manner, the computer can be a part of a network of computers, such as a local area network, a wide area network, or an Intranet, or a network of networks, such as the Internet. Any or all components of electronic system 1000 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network and a wide area network, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

We claim:

1. A method for controlling an inclination of a floating wind turbine platform comprising a generator, a set of turbine blades connected to a shaft inside a turbine nacelle, the turbine nacelle being mounted onto a tower, and at least three stabilizing columns to which the tower is mounted, each of the at least three stabilizing columns having an internal volume for containing ballast, and a plurality of pumps for distributing ballast among the column internal volumes, the method comprising:

receiving, at a processor, position data associated with a current orientation of the floating wind turbine platform from accelerometers on the floating wind turbine platform;

determining, at the processor, based on the position data, a heel angle in reference to the floating wind turbine platform;

sending, from the processor, a first signal for adjusting at least one of a blade pitch of the set of turbine blades and a torque of the generator based on the determined heel angle;

sending, from the processor, a second signal for distributing the ballast among the at least three stabilizing columns, wherein the second signal for distributing the ballast is based on the determined heel angle and the first signal for adjusting the at least one of the blade pitch of the set of turbine blades and the torque of the generator;

adjusting at least one of the blade pitch of the set of turbine blades and the torque of the generator based on the first signal; and distributing, by the plurality of pumps, the ballast among the at least three stabilizing columns based on the second signal.

2. The method of claim 1, wherein sending the first signal is for adjusting at least one of the blade pitch of the set of turbine blades and the torque of the generator to alter an aerodynamic torque of the floating wind turbine platform, when the determined heel angle is above a predetermined angle threshold.

3. The method of claim 1, further comprising:

receiving, at the processor, wind speed and direction data, wherein the sending, from the processor, of the first signal for adjusting the at least one of the blade pitch of the set of turbine blades and the torque of the generator is further based on the received wind speed and direction data.

4. The method of claim 3, wherein sending the first signal is for adjusting at least one of the blade pitch of the set of turbine blades and the torque of the generator to change an aerodynamic torque of the floating wind turbine platform, when the wind speed and direction data indicates a wind speed above a predetermined wind threshold.

5. The method of claim 4, wherein the first signal is for adjusting the blade pitch of the set of turbine blades at a first predetermined wind threshold, and for adjusting the torque of the generator at a second predetermined wind threshold, wherein the first predetermined wind threshold is lower than the second predetermined wind threshold.

6. The method of claim 1, wherein the position data associated with an orientation of the floating wind turbine platform is continuously received in real-time, and wherein determining the heel angle in reference to the floating wind turbine platform comprises applying a low-pass filter to the continuously received position data to cancel out high-frequency disturbances in the position data.

7. The method of claim 1, wherein the position data associated with the orientation of the floating wind turbine platform comprises roll and pitch angles of the floating wind turbine platform.

8. The method of claim 7, wherein the second signal for distributing the ballast among the at least three stabilizing columns directs a transfer of the ballast from an internal volume of one of the stabilizing columns to an internal volume of at least one of the other stabilizing columns, wherein the transfer of the ballast counteracts the roll and pitch angles of the floating wind turbine platform to reduce the determined heel angle.

9. A non-transitory computer-readable medium comprising instructions stored therein, the instructions for controlling an inclination of a floating wind turbine platform, the wind turbine platform comprising a generator, a set of turbine blades connected to a shaft inside a turbine nacelle, the turbine nacelle being mounted onto a tower, and at least three stabilizing columns to which the tower is mounted, each of the at least three stabilizing columns having an internal volume for containing ballast, and the instructions which when executed by a system, cause the system to perform operations comprising:
receiving roll and pitch angle data in a defined frame of reference of the floating wind turbine platform;
adjusting at least one of a blade pitch of the set of turbine blades and a torque of the generator to alter an aerodynamic torque of the floating wind turbine platform, the adjusting being based on the received roll and pitch angle data;
determining a heel angle in reference to the floating wind turbine platform based on the received roll and pitch angle data; and
distributing the ballast among the at least three stabilizing columns in order to counteract the determined heel angle, the distributing being based on i) the adjusting of at least one of the blade pitch of the set of turbine blades and the torque of the generator, and ii) the received roll and pitch angle data.

10. The non-transitory computer-readable medium of claim 9, further comprising instructions stored therein, which when executed by the system, cause the system to perform operations comprising:
receiving wind speed and direction data, wherein the instructions for adjusting the at least one of the blade pitch of the set of turbine blades and the torque of the generator, and the instructions for distributing of the ballast are further based on the received wind speed and direction data.

11. The non-transitory computer-readable medium of claim 9, wherein the instructions for distributing of the ballast among the at least three stabilizing columns further comprises instructions for utilizing a pre-compensation algorithm based on a look-up table to determine an optimal distribution of the ballast, the pre-compensation algorithm receiving at least one of the blade pitch of the set of turbine blades and the torque of the generator, and the roll and pitch angle data as input data.

12. The non-transitory computer-readable medium of claim 9, wherein the instructions for adjusting of the at least one of the blade pitch of the set of turbine blades and the torque of the generator increase the aerodynamic torque of the floating wind turbine platform when the distributing of the ballast among the at least three stabilizing columns reduces the heel angle.

13. The non-transitory computer-readable medium of claim 10, wherein the instructions for adjusting of the at least one of the blade pitch of the set of turbine blades and the torque of the generator decrease the aerodynamic torque of the floating wind turbine platform when the received wind speed and direction data is calculated to cause an increase in the heel angle.

14. The non-transitory computer-readable medium of claim 9, wherein the instructions for adjusting at least one of the blade pitch of the set of turbine blades and the torque of the generator to alter the aerodynamic torque of the floating wind turbine platform are further based on a speed at which the set of turbine blades turn.

15. The non-transitory computer-readable medium of claim 9, wherein the instructions for adjusting the at least one of the blade pitch of the set of turbine blades and the torque of the generator comprises instructions for gradually adjusting the pitch of the set of turbine blades while ballast is distributed among the at least three stabilizing columns, in order to control the inclination of the floating wind turbine platform during startup and shutdowns procedures.

16. The non-transitory computer-readable medium of claim 15, wherein the gradual adjusting of the pitch of the set of turbine blades is proportionally counteracted by the distributing of the ballast among the at least three stabilizing columns.

17. The non-transitory computer-readable medium of claim 10, wherein the instructions for distributing the ballast among the at least three stabilizing columns further comprises anticipating a change in wind speed or direction based on the received wind speed and direction data,
wherein the distributing the ballast among the at least three stabilizing columns is further based on the anticipated change in wind speed or direction, and
wherein the distributing of the ballast is partially completed prior to the adjusting of the at least one of the blade pitch of the set of turbine blades and the torque of the generator when the anticipated change in the wind speed or direction triggers an imminent startup or shutdown procedure of the turbine.

18. A system for controlling inclinations of a plurality of floating wind turbine platforms, each of the plurality of wind turbine platforms comprising a generator, a set of turbine blades connected to a shaft inside a turbine nacelle, the turbine nacelle being mounted onto a tower, and at least three stabilizing columns to which the tower is mounted, each of the at least three stabilizing columns having an internal volume for containing ballast, the system comprising:
one or more processors; and
a machine-readable medium comprising instructions stored therein, which when executed by the processors, cause the one or more processors to perform operations comprising:
receiving wind speed and direction data at one of the plurality of floating wind turbine platforms;
adjusting, for each of the plurality of wind turbine platforms, a blade pitch of the set of turbine blades at a first predetermined wind speed threshold and adjusting, for each of the plurality of wind turbine platforms, a torque of the generator at a second predetermined wind speed threshold, to alter an aerodynamic torque of the floating wind turbine platforms, the adjusting being based on the received wind speed and direction data; and
distributing, for each of the plurality of wind turbine platforms, the ballast among the at least three stabilizing columns, the distributing being based on i) the adjusting of the blade pitch of the set of turbine blades, ii) the adjusting of the torque of the generator, and iii) the received wind speed and direction data.

19. The system of claim 18, wherein the machine-readable medium further comprises instructions for:
identifying a leading wind turbine platform from the plurality of wind turbine platforms, the leading wind turbine platform being the wind turbine platform in the most upwind position of the plurality of wind turbine platforms.

20. The system of claim 19, wherein the instructions for receiving wind speed and direction data at one of the plurality of floating wind turbine platforms comprises instructions for receiving wind speed and direction data from the leading wind turbine platform.

21. The system of claim 18, wherein the first predetermined wind speed threshold is lower than the second predetermined wind speed threshold.

22. The system of claim 18, wherein the instructions for distributing, for each of the plurality of wind turbine platforms, the ballast among the at least three stabilizing columns comprises instructions for directing a transfer of the ballast from an internal volume of one of the stabilizing columns to an internal volume of at least one of the other stabilizing columns.

* * * * *